(12) United States Patent
Shirasaki et al.

(10) Patent No.: US 7,732,519 B2
(45) Date of Patent: Jun. 8, 2010

(54) EMULSION COMPOSITION FOR SILICONE RUBBER, PROCESS FOR PRODUCING THE SAME, AND PROCESS FOR PRODUCING SILICONE RUBBER

(75) Inventors: Shinya Shirasaki, Fukui (JP); Tadanori Fukamachi, Fukui (JP); Mitsuo Hamada, Chiba (JP)

(73) Assignee: Dow Corning Toray Co., Ltd., Tokyo (JP)

( * ) Notice: Subject to any disclaimer, the term of this patent is extended or adjusted under 35 U.S.C. 154(b) by 0 days.

(21) Appl. No.: 12/536,702

(22) Filed: Aug. 6, 2009

(65) Prior Publication Data

US 2009/0292056 A1    Nov. 26, 2009

Related U.S. Application Data

(62) Division of application No. 10/558,167, filed on Dec. 5, 2006.

(30) Foreign Application Priority Data

May 23, 2003   (JP) .............................. 2003-146879
May 21, 2004   (WO) ................. PCT/JP2004/007283

(51) Int. Cl.
*C08K 3/34*    (2006.01)
*C08G 77/04*   (2006.01)
*C08G 77/12*   (2006.01)

(52) U.S. Cl. ........................... 524/446; 528/10; 528/12; 528/15; 528/31; 528/32; 528/33

(58) Field of Classification Search ............. 528/10–31; 524/446

See application file for complete search history.

(56) References Cited

U.S. PATENT DOCUMENTS

| | | | |
|---|---|---|---|
| 4,025,485 A | 5/1977 | Kodarma et al. | |
| 4,248,751 A | 2/1981 | Willing | |
| 4,338,294 A | 7/1982 | Mast | |
| 4,391,921 A | 7/1983 | Johnson | |
| 4,431,452 A * | 2/1984 | Comper et al. ............ | 106/38.22 |
| 4,504,621 A * | 3/1985 | Lefler, III ................... | 524/783 |
| 4,791,029 A | 12/1988 | Fau et al. | |
| 4,806,391 A * | 2/1989 | Shorin ........................ | 427/288 |
| 4,840,742 A * | 6/1989 | Hoffman .................... | 508/143 |
| 4,954,554 A | 9/1990 | Bunge | |
| 4,978,710 A * | 12/1990 | Liles ........................... | 524/837 |
| 5,104,927 A | 4/1992 | Hara et al. | |
| 5,247,045 A | 9/1993 | Durfee et al. | |
| 5,306,737 A | 4/1994 | Burhart et al. | |
| 5,332,762 A | 7/1994 | Maschberger et al. | |
| 5,741,439 A * | 4/1998 | Armstrong et al. ............ | 516/73 |
| 5,777,017 A * | 7/1998 | Funk et al. .................. | 524/375 |
| 5,789,084 A | 8/1998 | Nakamura et al. | |
| 5,968,660 A * | 10/1999 | Armstrong et al. .......... | 428/447 |
| 6,491,980 B1 | 12/2002 | Muller et al. | |
| 6,881,798 B2 * | 4/2005 | Choi et al. ................... | 525/341 |
| 7,459,423 B2 * | 12/2008 | Blyth et al. .................. | 510/507 |
| 7,531,613 B2 * | 5/2009 | Williams et al. .............. | 528/38 |
| 2002/0055581 A1 | 5/2002 | Lorah et al. | |
| 2002/0061365 A1 | 5/2002 | Grape et al. | |
| 2003/0108498 A1 | 6/2003 | Stephens et al. | |

FOREIGN PATENT DOCUMENTS

| | | |
|---|---|---|
| EP | 0542498 A2 | 5/1993 |
| JP | 56036546 | 4/1981 |
| JP | 59012832 | 1/1984 |
| JP | 63006053 | 1/1988 |
| JP | 2248463 | 10/1990 |
| JP | 5222292 | 8/1993 |
| JP | 6166753 | 6/1994 |
| JP | 6166754 | 6/1994 |
| JP | 6207038 | 7/1994 |
| JP | 10060283 | 3/1998 |
| JP | 2000169590 | 6/2000 |
| JP | 2000169704 | 6/2000 |
| JP | 2000178448 | 6/2000 |
| JP | 2002114860 | 4/2002 |
| JP | 2002205911 | 7/2002 |
| JP | 2004091569 | 3/2004 |
| JP | 2004143332 | 5/2004 |

OTHER PUBLICATIONS

English language abstract for JP2248463 obtained from espacenet.com Aug. 9, 2006.
English language abstract for JP5222292 obtained from espacenet.com Aug. 9, 2006.
English language abstract for JP6166753 obtained from espacenet.com Aug. 9, 2006.
English language abstract for JP6166754 obtained from espacenet.com Aug. 9, 2006.
English language abstract for JP10060283 obtained from espacenet.com Aug. 9, 2006.

(Continued)

*Primary Examiner*—Randy Gulakowski
*Assistant Examiner*—Robert Loewe
(74) *Attorney, Agent, or Firm*—Howard & Howard Attorneys PLLC

(57) ABSTRACT

A silicone rubber emulsion composition comprising (A) 100 parts diorganopolysiloxane having at least two silicon-bonded alkenyl groups, (E) 0 to 60 parts reinforcing silica filler, (B) 10 to 250 parts water containing a smectite clay, (C) 0.1 to 15 parts emulsifier, and (D) a cross-linking agent (e.g., an organohydrogenpolysiloxane) in an amount sufficient for cross-linking component (A) and a catalyst (e.g., a platinum-type catalyst). A method for preparing the aforementioned emulsion composition comprising mixing components (A) and (E) with other components in a high-speed stirrer-equipped mixer. A method of manufacturing a silicone rubber comprising either heating and dehydrating the aforementioned emulsion composition.

20 Claims, No Drawings

OTHER PUBLICATIONS

English language abstract for JP56036546 obtained from espacenet.com Nov. 28, 2006.
English language abstract for JP59012832 obtained from espacenet.com Nov. 29, 2006.
English language abstract for JP63006053 obtained from espacenet.com Nov. 29, 2006.
English language abstract for JP2000169590 obtained from espacenet.com Nov. 29, 2006 and translation obtained from Japanese Patent Office website on Aug. 4, 2009.
English language abstract for JP2000169704 obtained from espacenet.com Aug. 9, 2006 and translation obtained from Japanese Patent Office website on Aug. 4, 2009.
English language abstract for JP2000178448 obtained from espacenet.com Aug. 9, 2006 and translation obtained from Japanese Patent Office website on Aug. 4, 2009.
English language abstract for JP2002114860 obtained from espacenet.com Aug. 9, 2006 and translation obtained from Japanese Patent Office website on Aug. 4, 2009.
English language abstract for JP2002205911 obtained from espacenet.com Aug. 9, 2006 and translation obtained from Japanese Patent Office website on Aug. 4, 2009.
English language abstract for JP2004091569 obtained from espacenet.com Nov. 29, 2006 and translation obtained from Japanese Patent Office website on Aug. 4, 2009.
English language abstract for JP2004143332 obtained from espacenet.com Aug. 9, 2006 and translation obtained from Japanese Patent Office website on Aug. 4, 2009.
English language abstract for JP6207038 obtained from espacenet.com May 24, 2007 and translation obtained from Japanese Patent Office website on Aug. 4, 2009.

* cited by examiner

EMULSION COMPOSITION FOR SILICONE RUBBER, PROCESS FOR PRODUCING THE SAME, AND PROCESS FOR PRODUCING SILICONE RUBBER

RELATED APPLICATIONS

This present application is a divisional of U.S. patent application Ser. No. 10/558,167, which was filed on Dec. 5, 2006, which claims priority to and all the advantages of International Application No. PCT/JP2004/07283, filed on May 21, 2004, which claims priority to Japanese Patent Application No. 2003-146879, filed on May 23, 2003.

TECHNICAL FIELD

The present invention relates to an emulsion composition for manufacturing a silicone rubber, a method of preparation of the aforementioned composition, and a method of manufacturing the silicone rubber.

BACKGROUND ART

Normally, a silicone rubber is produced either by heating and curing a composition comprising a diorganopolysiloxane gum, a reinforcing silica filler, an organic peroxide, etc., or by heating and curing a liquid silicone rubber composition comprising a liquid vinyl-containing organopolysiloxane, a reinforcing silica filler, an organohydrogenpolysiloxane, a platinum catalyst, etc. Methods of manufacturing silicone elastomers from aqueous silicone emulsions and silicone emulsions for the above purposes are known in the art. For example, unexamined Japanese Patent Application Publication (hereinafter JP Kokai) S56-36546 teaches a method of obtaining a silicone elastomer by preparing an emulsion obtained by emulsifying in water an organohydrogenpolysiloxane and a polyorganosiloxane capped at both molecular terminals with vinyl groups, adding a platinum catalyst to the emulsion, forming a cross-linked latex by heating the catalyst-added emulsion, adding a colloidal silica to the latex, and evaporating the water from the latex. JP Kokai 2000-169590 teaches a method of manufacturing a silicone rubber by heating and curing an emulsion prepared from a vinyl-containing diorganopolysiloxane, an organohydrogenpolysiloxane, a platinum catalyst, a silicone resin, an emulsifier, water, carbon black, etc.

However, the method disclosed in JP Kokai S56-36546 involves complicated operations and makes it difficult to obtain a uniform elastomer with repeatable properties. On the other hand, the method disclosed in JP Kokai 2000-169590 allows obtaining of silicone rubber with colors only between gray and black.

Furthermore, a silicone rubber sponge, which is a porous silicone rubber, is normally produced by heating and curing a silicone rubber composition comprising a diorganopolysiloxane gum, a reinforcing silica filler, a blowing agent, an organic peroxide, etc., or by heating and curing a liquid silicone rubber composition comprising a liquid vinyl-containing diorganopolysiloxane, a reinforcing silica filler, a blowing agent, an organohydrogenpolysiloxane, a platinum catalyst, etc.

Also known is JP Kokai S59-12832 that relates to a novel method and a composition therefore that teaches a method of manufacturing a silicone rubber sponge by freezing a condensation-reaction-curable silicone emulsion consisting of a diorganopolysiloxane capped at both molecular terminals with hydroxyl groups, an organotin catalyst, and a colloidal silica to a hard state, and then thawing and dehydrating the frozen composition. Japanese Patent Publication H7-122000 discloses a method of manufacturing a silicone rubber sponge by combining a hydrosilation-curable or organoperoxide-curable silicone rubber composition with an emulsion consisting of an organopolysiloxane, an emulsifier, water, and thickener, and then heating the combined composition to form a silicone rubber sponge where expansion action of evaporating water is utilized for forming a sponge. JP Kokai 2002-114860 describes a method of manufacturing a silicone rubber sponge by heating a hydrosilation reaction-, i.e. an addition reaction-curable silicone rubber sponge composition comprising an alkenyl-containing diorganopolysiloxane, an organohydrogenpolysiloxane, a platinum catalyst, and a water-absorbing organic polymer powder.

However, the method disclosed in JP Kokai S59-12832 is not suitable for commercial application as it is time-consuming and requires a significant amount of energy for freezing the silicone emulsion and thawing the frozen silicone emulsion. Furthermore, the use of the organotin catalyst does not allow obtaining a silicone rubber with heat-resistant properties. The method disclosed in Japanese Patent Publication H7-122000 indispensably needs a thickener which is an aqueous organic polymer, while the method of JP Kokai 2002-114860 indispensably needs a water-absorbing organic polymer powder. Therefore, the problem associated with both last-mentioned methods is that silicone rubber sponges produced by these methods will have poor resistance to heat and low mechanical strength.

DISCLOSURE OF THE INVENTION

It is an object of the present invention to provide a novel emulsion composition for manufacturing a silicone rubber, a method for preparation of the emulsion composition, and a method for manufacturing a silicone rubber from the aforementioned emulsion composition, that solve the problems of the prior art. A more specific object of the present invention is to provide a silicone rubber emulsion composition for manufacturing a mechanically strong silicone rubber having a low density or a mechanically strong silicone rubber sponge, as well as to provide a method for the preparation of such an emulsion composition, and a simplified method for manufacturing a mechanically strong silicone rubber having a low-density or a mechanically strong silicone rubber sponge from the aforementioned emulsion composition.

More specifically, the present invention relates to the following:

1. An emulsion composition for manufacturing a silicone rubber comprising: (A) 100 parts by weight of a diorganopolysiloxane having at least two silicon-bonded alkenyl groups in one molecule; (E) 0 to 60 parts by weight of a reinforcing silica filler; (B) 10 to 250 parts by weight of water that contains a smectite clay; (C) 0.1 to 15 parts by weight of an emulsifier; (D) a cross-linking agent in an amount sufficient for cross-linking component (A) and a catalyst.
2. The emulsion composition for manufacturing a silicone rubber according to Item 1, wherein said smectite clay is a synthetic saponite.
3. The emulsion composition for manufacturing a silicone rubber according to Items 1 or 2, wherein component (B) contains said smectite clay in the amount of 1 to 10 parts by weight per 100 parts by weight of water.
4. The emulsion composition for manufacturing a silicone rubber according to Items 1 or 2, wherein said component (C) is a non-ionic surface-active agent.

5. The emulsion composition for manufacturing a silicone rubber according to Items 1 or 2, wherein said cross-linking agent of component (D) is an organopolysiloxane having at least two silicon-bonded hydrogen atoms in one molecule, and wherein said catalyst is a platinum-type catalyst.

6. A method for preparation of an emulsion composition for manufacturing a silicone rubber of Item 1 comprising the steps of loading a mixture of an appropriate amount of component (A) and an appropriate amount of component (E) together with an appropriate amount of components (B) and (C) into a high-speed stirrer-equipped mixer, mixing the components till a uniform emulsion is formed, loading into the mixer an appropriate amount of component (D), and then stirring and mixing the components.

7. A method for preparation of an emulsion composition for manufacturing a silicone rubber of Item 1 comprising the steps of mixing a mixture of an appropriate amount of component (A) and an appropriate amount of component (E) with an appropriate amount of component (D), loading the obtained mixture together with an appropriate amount of component (B) and an appropriate amount of component (C) into a high-speed stirrer-equipped mixer, and then stirring and mixing the components till a uniform emulsion is formed.

8. A method of manufacturing a silicone rubber comprising the steps of heating an emulsion composition for manufacturing a silicone rubber comprising (A) 100 parts by weight of a diorganopolysiloxane having at least two silicon-bonded alkenyl groups in one molecule; (E) 0 to 60 parts by weight of a reinforcing silica filler; (B) 10 to 250 parts by weight of water that contains a smectite clay; (C) 0.1 to 15 parts by weight of an emulsifier; and (D) a cross-linking agent in an amount sufficient for cross-linking component (A) and a catalyst, thus forming a wet silicone rubber-like substance, and then dehydrating the obtained wet silicone rubber-like substance.

9. A method of manufacturing a silicone rubber comprising the step of heating and dehydrating an emulsion composition for manufacturing a silicone rubber comprising (A) 100 parts by weight of a diorganopolysiloxane having at least two silicon-bonded alkenyl groups in one molecule; (E) 0 to 60 parts by weight of a reinforcing silica filler; (B) 10 to 250 parts by weight of water that contains a smectite clay; (C) 0.1 to 15 parts by weight of an emulsifier; and (D) a cross-linking agent in an amount sufficient for cross-linking component (A) and a catalyst.

10. A method of manufacturing a silicone rubber according to Items 8 or 9, further comprising the step of mixing the mixture of components (A) and (E) with other components.

BEST MODE FOR CARRYING OUT THE INVENTION

A typical emulsion composition for manufacturing a silicone rubber [hereinafter referred to as a silicone rubber emulsion composition] that comprises (A) 100 parts by weight of a diorganopolysiloxane having at least two silicon-bonded alkenyl groups in one molecule, (E) 0 to 60 parts by weight of a reinforcing silica filler, (B) 10 to 250 parts by weight of water that contains a smectite clay, (C) 0.1 to 15 parts by weight of an emulsifier, (D) a cross-linking agent in an amount sufficient for cross-linking component (A) and a catalyst, has a cross-linking agent in the form of (d1) an organohydrogenpolysiloxane with at least two silicon-bonded hydrogen atoms in one molecule and a catalyst in the form of (d2) a platinum-type catalyst.

When diorganopolysiloxane (A) having at least two silicon-bonded alkenyl groups in one molecule is cross-linked under the effect of the cross-linking agent and the catalyst of component (D), it is turned into a rubber-like form. When the cross-linking agent is organohydrogenpolysiloxane (d1) with at least two silicon-bonded hydrogen atoms in one molecule and the catalyst is platinum-type catalyst (d2), the alkenyl groups of component (A) and the silicon-bonded hydrogen atoms of constituent (d1) participate in an addition reaction and thus cross-link to form a rubber-like substance.

Alkenyl groups of the aforementioned diorganopolysiloxane (A) having at least two silicon-bonded alkenyl groups in one molecule may be represented by vinyl, allyl, propenyl, hexenyl, or similar groups, of which vinyl group is preferable for ease of production. Organic groups other than alkenyl groups are methyl, ethyl, propyl, hexenyl or similar alkyl groups; phenyl, tolyl or similar aryl groups; 3,3,3-trifluoropropyl, 3-chloropropyl, or similar halogenated alkyl groups, etc. Methyl group is preferable for ease of production. Component (A) may have a linear or a partially-branched linear molecular structure. There are no special limitations with regard to the molecular weight of this component, provided that it allows emulsification by components (B) and (C). Component (A) is preferably liquid at room temperature and preferably has a viscosity that at 25° C. is not less than 100 mPa·s, but is not more than 100,000 mPa·s.

The following are examples of component (A): a dimethylpolysiloxane having both molecular terminals capped with dimethylvinylsiloxy groups, a methylalkylpolysiloxane, methylvinylpolysiloxane, a dimethylsiloxane-methylvinylsiloxane copolymer, a methylphenylpolysiloxane, a methyl (3,3,3-trifluoropropyl) polysiloxane; a methylvinylpolysiloxane having both molecular terminals capped with trimethylsiloxy groups; a dimethylsiloxane-methylvinylsiloxane copolymer having both molecular terminals capped with trimethylsiloxy groups; a methylvinylpolysiloxane having both molecular terminals capped with dimethylhydroxylsiloxy groups; a dimethylsiloxane-methylvinylsiloxane copolymer; and a dimethylpolysiloxane having both molecular terminals capped with methyldivinylsiloxy or trivinylsiloxy groups. The aforementioned diorganopolysiloxanes can be used individually or in combinations or two or more.

The cross-linking agent of component (D) is (d1) an organohydrogenpolysiloxane that contains at least two silicon-bonded hydrogen atoms in one molecule. Under the effect of the catalyst of component (D), which preferably is a platinum-type catalyst, the silicon-bonded hydrogen atoms of the cross-linking agent are added to the alkenyl groups of component (A) and thus cross-link component (A) and cure the composition. Constituent (d1) contains at least two silicon-bonded hydrogen atoms in one molecule, but when component (A) contains two silicon-bonded alkenyl groups, the number of silicon-bonded hydrogen atoms in aforementioned constituent (d1) may be three or more. The following are examples of silicon-bonded organic groups of constituent (d1): methyl, ethyl, propyl, hexyl, or similar aralkyl groups; phenyl, tolyl, or similar aryl groups; 3,3,3-trifluoropropyl, 3-chloropropyl, or similar halogenated alkyl groups. Constituent (d1) may have a linear, a partially-branched linear, cyclic, or a net-like molecular structure. There are no special restrictions with regard to a degree of polymerization of constituent (d1), provided that it is greater than 2, but viscosity preferably is within the range of 3 to 10,000 mPa·s at 25° C.

A compounding ratio of component (A) and constituent (d1) should be selected so that the mole ratio of the silicon-bonded hydrogen atoms of constituent (d1) to the silicon-bonded alkenyl groups of component (A) is within the range of (0.5:1) to (20:1), preferably within the range of (0.8:1) to (5:1). If the aforementioned mole ratio is lower than 0.5, it will be difficult to provide the composition with good curability, and if the aforementioned ratio exceeds 20, the cured body will be too hard.

A platinum-type catalyst, which is constituent (d2), provides a catalytic action for adding the silicon-bonded hydrogen atoms of constituent (d1) to the silicon-bonded alkenyl groups of component (A) and thus for cross-linking and curing of the latter. The platinum-type catalyst can be exemplified by a fine platinum powder, platinum black, chloroplatinic acid, a complex of olefin and a chloroplatinic acid, a complex of chloroplatinic acid and divinyltetramethyldisiloxane, a complex of divinyltetramethyldisiloxane and platinum, a complex of chloroplatinic acid and β-diketone, a complex of platinum and β-diketone, a rhodium compound, and a palladium compound. Constituent (d2) is added in the so-called catalytic quantity sufficient for promoting an addition of the silicon-bonded hydrogen atoms of constituent (d1) to the silicon-bonded alkenyl groups of component (A) and, hence, for cross-linking of component (A) and for curing the composition. More specifically, in terms of metallic platinum contained in component (A), this constituent should be added in an amount of 1 to 1000 weight ppm. Component (D) can also be an organic peroxide that may function as a cross-linking agent and a catalyst.

Water of component (B) that contains a smectite clay is used as a medium for emulsification of component (A). It increases viscosity of the emulsion composition, and improves mechanical strength of the silicone rubber. There are no special restrictions with regard to the water of component (B), provided that it is sufficiently clean. This may be tap water, well water, ion-exchange water, or distilled water. Component (B) can be used in an amount of 10 to 250 parts by weight, preferably, 20 to 200 parts by weight per 100 parts by weight of component (A). When the smectite clay that is present in component (B) is dispersed in water, it swells, increases the viscosity of the water, and makes it possible to form a stable emulsion even with small amounts of emulsifier.

It is recommended that the smectite clay of component (B) be added in the amount of 0.5 to 10 wt. %, preferably, 1 to 8 wt. % of the water. If it is added in an amount of less than 0.5%, viscosity of component (B) will remain low and it will be difficult to form a stable emulsion. If, on the other hand, the smectite clay is added in an amount exceeding 10 wt. %, component (B) will become too viscous, and it will be difficult to emulsify component (A). The smectite clay of component (B) can be represented by bentonite, montmorillonite, hectorite, saponite, sauconite, beidellite, nontronite, or similar natural or synthesized smectite-type clays. When a smectite clay is dispersed in water, it noticeably swells, the diameter of the particles decreases, and the water becomes more viscous and thixotropic. It is preferable to use saponite that has very high swelling properties, and even more preferable to use a light-color synthetic saponite. An example of a light-color saponite is Smecton S, which is a hydrothermal synthetic product of Kunimine Kogyo Company, Ltd.

Component (C) is used for emulsification of components (A) and (B) in water and for forming a stable aqueous emulsion. There are no special restrictions with regard to the type of the emulsifier that may be added to the composition, provided that this agent possesses sufficient emulsification capacity and does not conflict with the cross-linking reaction.

In general, however, it is recommended to use a non-ionic emulsifier. Non-ionic surface-active agents that may be used as aforementioned non-ionic emulsifiers may be exemplified by a polyoxyethylene alkyl ether, polyoxyethylene phenyl ether, ethyleneglycol monofatty acid ester, propyleneglycol monofatty acid ester, sorbitane monofatty acid ester, sorbitane tri-fatty acid ester, polyoxyethylene monofatty acid ester, polyoxyethylene di-fatty acid ester, polyoxyethylene propyleneglycol fatty acid ester, and POE polyhydric alcohol ether. It is recommended that HLB value of the emulsifier be within the range of 4 to 14. The aforementioned emulsifiers can be used individually or in combinations of two or more.

Due to a thickening action of component (B), the amount of component (C) to be added to the composition can be greatly reduced. In general, component (C) should be added in an amount of 0.1 to 15 parts by weight, and preferably, 0.5 to 12 parts by weight per 100 parts by weight of component (A). If it is used in an amount less than 0.1 part by weight, it will be difficult to obtain a stable emulsion, and if it is used in an amount exceeding 15 parts by weight, this will impair heat-resistant properties of a formed silicone rubber.

If only components (A) and (B) are used, the emulsion will be too flowable, and the formed silicone rubber will have insufficient mechanical strength. Therefore, various fillers are added to the composition for adjusting flowability and for improving mechanical strength in a cured product. The aforementioned fillers may be represented by (E) fumed silica, precipitated silica, aerogel, or a similar reinforcing silica filler; carbon black, colloidal-type calcium carbonate, fumed titanium dioxide, or a similar reinforcing filler; graphite powder; gold, silver, nickel, copper, aluminum, iron, cobalt, titanium, or a similar metal powder; aluminum oxide, magnesium oxide, calcium oxide, boron oxide, barium oxide, zirconium oxide, iron oxide, cerium oxide, lanthanum oxide, precipitated titanium oxide, bismuth oxide, tin oxide, or similar metal oxides; iron oxide cobalt bismuth [sic], barium zirconate, or a similar metal compound powder; quartz, diatomaceous earth, kaolin, zeolite, tourmaline, or a similar mineral powder; titanium carbide, aluminum carbide, tungsten carbide, zirconium carbide, or a similar metal carbide powder; silicon nitride, aluminum nitride, chromium nitride, zirconium nitride, or a similar metal nitride powder; silicon carbide fibers, alumina short fibers, potassium titanium oxide fibers, glass fibers, or similar inorganic fibers; lead carbonate, manganese carbonate, calcium carbonate, magnesium carbonate, or a similar metal carbonate powder; aluminum hydroxide, calcium hydroxide, bismuth hydroxide, apatite, or a similar metal hydroxide powder; glass balloons, microballoons of borosilicate, and Shirasu balloons, or similar hollow inorganic particles, or other non-reinforcing fillers. The aforementioned fillers, especially reinforcing silica filler (E), may be subjected to hydrophobic surface treatment with an organic silicon compound such as trimethylchlorosilane, dimethyldichlorosilane, hexamethyldisilazane, octamethylcyclotetrasiloxane, etc.

In order to improve mechanical strength in a formed silicone rubber, the amount of the reinforcing silica filler (E) added to the emulsion composition of the present invention should not exceed 60 parts by weight per 100 parts by weight of component (A). It is understood that, depending on the type of the reinforcing silica filler, its thickening and mechanical-strength improving effects will be different, but, in general, such a filler should be added in an amount of 3 to 40 parts by weight per 100 parts by weight of component (A). Conditions for emulsification and dispersion are facilitated if a silicone rubber base is formed by premixing the reinforcing silica filler (E) with component (A).

In a majority of cases, a mixture of component (A) with constituents (d1) and (d2) is subjected to an addition reaction, and in order to inhibit development of cross-linking during emulsification or during storage of the emulsified product, it is recommended to add to the composition an addition reaction inhibitor. Such an addition reaction inhibitor may be exemplifies by an acetylene alcohol, enyne compound, benzotriazole, and tetramethyltetravinylcyclotetrasiloxane. The addition reaction inhibitor should be added in amounts that can inhibit an addition reaction at room temperature and do not obstruct an addition reaction under heating. The recommended amount is 0.01 to 5 parts by weight per 100 parts by weight of the total weight of component (A) with constituent (d1).

If necessary, the emulsion composition of the present invention may be combined with other additives such as a thickener exemplified by alginic acid, sodium alginate, a sodium salt of a carboxylate, a sodium salt of a carboxy cellulose; a methyl cellulose, ethyl cellulose, hydroxyethyl cellulose, a modified starch, polyvinyl alcohol, sodium polyacrylate or sodium polymethylacrylate, or other water-soluble polymers; polyacrylic acid type, polyacrylonitrile type, an acrylate-polyvinylalcohol copolymer type, an acrylate-acrylamide copolymer type, carboxylmethylcellulose type, starch-acrylonitrile type, cross-linked starch-polyacrylate graft-copolymer type, or a similar water-absorbing polymer, or other additives that may be added in amounts that do not impair emulsification conditions and mechanical strength and heat-resistant properties of the silicone rubber. Other additives may comprise alcohols, heat-resistant agents, flame retardants, plasticizers, adhesive agents, etc.

A silicone rubber emulsion composition comprising components (A), (B), (C), and (D) may be prepared, e.g., by the following methods.

(1) A high-speed mixer equipped with a stirrer is loaded with appropriate amounts of components (A), (B), (C), and (D), and an emulsion composition is prepared by uniformly stirring and mixing the components.

(2) A high-speed mixer equipped with a stirrer is loaded with appropriate amounts of components (A), (B), and (C); the components are uniformly stirred and mixed till the formation of a uniform emulsion, and an appropriate amount of component (D) is added to the emulsion, which is then stirred and mixed.

(3) A high-speed mixer equipped with a stirrer is loaded with a mixture of appropriate amounts of components (A) and (D) and an appropriate amount of components (B) and (C), and the components are then stirred and mixed till the formation of a uniform emulsion composition.

A silicone rubber emulsion comprising components (A), (E), (B), (C), and (D) can be prepared by stirring and mixing the above-described components by the same methods as described above but using a mixture of components (A) and (E) instead of component (A).

There no special restrictions with regard to a mixer suitable for realization of the method of the present invention, provided that the mixer develops a high shear force and produces a stable emulsion. This may be a homomixer, paddle mixer, Henschel mixer, homo-dispenser, colloidal mill, a vacuum stirrer-mixer, etc.

If air bubbles are formed in the emulsion composition during mixing, it is recommended to subject the emulsion composition to deaeration. Deaeration is carried out by reducing pressure in the aforementioned emulsion composition by means of a vacuum pump either during stirring of the composition inside the mixer or during storage of the emulsion composition in a storage container. There are no special restrictions with regard to the degree of vacuum or deaeration time, and the deaeration operation should be continued until air bubbles are not visually observed.

Finally, a silicone rubber with a low-density or a silicone rubber sponge can be produced by first forming a wet silicone rubber-like substance either by holding the silicone rubber emulsion composition at room temperature or by heating the composition and then dehydrating the wet silicone rubber-like substance. For example, component (A) can be cross-linked and a wet silicone rubber-like substance or a wet silicone rubber sponge can be formed by cross-linking component (A) at a temperature from room temperature to 150° C., preferably from 50° C. to 120° C., and then a silicone rubber with a low-density or a silicone rubber sponge can be produced by dehydrating the obtained wet silicone rubber-like substance or a silicone rubber sponge-like substance at a heat treatment temperature of 100° C. to 250° C. Alternatively, a silicone rubber with a low-density or a silicone rubber sponge can be produced directly from the silicone rubber emulsion by heating and dehydrating the emulsion composition.

Furthermore, if the amount of water contained in a silicone rubber emulsion composition is insignificant, the silicone rubber obtained from such an emulsion composition will have high density, and if the amount of water in the emulsion composition is significant, the silicone rubber will have low density and will be obtained in a sponged form. Therefore, density of a silicone rubber product can be controlled by adjusting the content of water in the emulsion composition.

PRACTICAL EXAMPLES

The present invention will be further described in more detail with reference to practical and comparative examples. In the following description, all parts are parts by weight, all percentages are wt. %, and values of viscosity are those measured at 25° C.

Characteristics of silicone rubbers and of silicone rubber emulsion compositions were measured as described below.

Emulsification Condition: Emulsification conditions of silicone rubber emulsion compositions were evaluated visually.

Density: A sample was punched out from a silicone rubber sheet with a punch of a predetermined diameter. Weight and thickness of the sample were measured, and density was calculated as the ratio of weight to volume ($g/cm^3$).

Tensile strength: This property was measured in accordance with JIS K6251.

Practical Example 1

100 parts of a dimethylpolysiloxane having both molecular terminals capped with dimethylvinylsiloxy groups and having a viscosity of 10,000 mPa·s (vinyl group content: 0.14%) and 17 parts of a fumed silica surface-treated with hexamethyldisilazane and having a BET specific surface area of 200 $m^2/g$ were uniformly mixed in a stirrer-equipped mixer and then kneaded for 2 hours at 180° C., whereby a flowable liquid silicone rubber base was prepared. The obtained silicone rubber base, water that contains Smecton SA (a trade name of Kunimine Industries Co., Ltd.; synthetic saponite having thin grains with average size of 20 μm: BET specific surface area: 160 $m^2/g$) (a content of Smecton SA: 2.0%), and a non-ionic surface-active agent in the form of sorbitane monooleate with the HLB value of 4.9 were loaded into a T.K. homomixer (Model Mark II 2.5, the product of Tokushu Kika Kogyo Co., Ltd.) in proportions indicated in Table 1 and mixed for 5 min. at the speed of 5000 rpm to produce an emulsion composition.

For each 100 parts of the dimethylpolysiloxane capped at both molecular terminals with dimethylvinylsiloxy groups contained in the obtained emulsion composition, the latter was mixed with 1 part of a dimethylsiloxane-methylvinylsiloxane copolymer capped at both molecular terminals with trimethylsiloxy groups (content of silicon-bonded hydrogen atoms: 0.8%), 0.1 part of a complex of chloroplatinic acid and divinyltetramethyldisiloxane (concentration of platinum: 0.4%), and 0.1 part of an addition-reaction inhibitor in the form of a 3,5-dimethyl-1-hexyn-3-ol, whereby a silicone rubber emulsion composition was prepared. Emulsification conditions of the obtained emulsion were observed. The emulsion composition was deaerated by a vacuum pump for removal of air bubbles and then was poured into a 2 mm-deep cavity of a sheet-type mold where it was cured for 10 min. at 90° C., whereby a wet silicone rubber-like sheet was produced. The obtained wet silicone rubber-like sheet was placed into a 120° C. hot-air circulation oven where it was dried by hot air for 3 hours to produce a light-color silicone rubber sheet. The obtained silicone rubber sheet was measured with regard to density and tensile strength. The results of measurements are shown in Table 1. It can be seen from Table 1 that the silicone rubber of the present practical example has high mechanical strength.

Practical Example 2

100 parts of a dimethylpolysiloxane having both molecular terminals capped with dimethylvinylsiloxy groups and having a viscosity of 10,000 mPa·s (vinyl group content: 0.14%) and 12 parts of a fumed silica surface-treated with hexamethyldisilazane and having a BET specific surface area of 200 $m^2/g$ were uniformly mixed in a stirrer-equipped mixer for 2 hours at 180° C., whereby a flowable liquid silicone rubber base was prepared.

An emulsion composition was prepared under the same conditions as in Practical Example 1 by combining the aforementioned liquid silicone rubber base with other components in proportions shown in Table 1. The obtained emulsion composition was further combined with a cross-linking agent, a platinum-type catalyst, and an addition-reaction inhibitor in the same amounts as in Practical Example 1 to produce a silicone rubber emulsion composition. Emulsification conditions thereof were observed. Similar to Practical Example 1, the emulsion composition was formed into a light-color silicone rubber sheet. Characteristics of the silicone rubber sheet were measured, and the results of measurement are shown in Table 1.

Comparative Example 1

A silicone rubber emulsion composition was prepared, emulsified, and checked with regard to emulsification conditions in the same manner as in Practical Example 1, with the exception that 120 parts of water gelled with SANFRESH ST-500D (a trade name of Sanyo Chemical Industries Ltd, water-absorbing polymer which is a cross-linked product of a partial sodium salt of polyacrylic acid (water-absorbing polymer contents: 2.0%) were used instead of water that contains Smecton SA. Characteristics of the silicone rubber sheet were measured, and the results of measurement are shown in Table 1. It can be seen that the silicone rubber of this comparative example has properties inferior to the silicone rubber of Practical Example 1.

Practical Example 3

The liquid silicone rubber base prepared in Practical Example 1 was compounded with the below listed components added in the following amounts per 100 parts of the dimethylpolysiloxane contained in the liquid silicone rubber base: 1 part of a methylhydrogensiloxane-dimethyl siloxane copolymer capped at both molecular terminals with trimethylsiloxy groups (content of silicon-bonded hydrogen atoms: 0.8%), 0.1 part of a complex of chloroplatinic acid and divinyltetramethyldisiloxane (concentration of platinum: 0.4%), and 0.1 part of an addition-reaction inhibitor in the form of 3,5-dimethyl-1-hexyn-3-ol were loaded into a plastic container and mixed. The mixture was loaded into a T.K. homomixer (Model Mark II 2.5, the product of Tokushu Kika Kogyo Co., Ltd.) and was further combined, in proportions indicated in Table 1, with water that contains Kunipia G4 (a trade name of Kunimine Industries Co., Ltd.; high-purity sodium-montmorillonite), SANNONIC SS-50 (a trade name of Sanyo Chemical Industries Ltd.; a high-purity alcohol-based non-ionic surface-active agent; HLB value: 10.5) as an emulsifier, and SANNONIC SS-70 (a trade name of Sanyo Chemical Industries Ltd.; a high-purity alcohol-based non-ionic surface-active agent; HLB value: 12.8) as an emulsifier. A silicone rubber emulsion composition was prepared by mixing the components in the same manner as in Practical Example 1. The emulsification conditions were observed. The obtained silicone rubber emulsion composition was formed into a silicone rubber sheet by the same method as in Practical Example 1. The measured characteristics of the silicone rubber sheet are shown in Table 1.

Comparative Example 2

A silicone rubber emulsion composition was prepared, emulsified, and checked with regard to emulsification conditions in the same manner as in Practical Example 3, with the exception that water was used without the Kunipia G4. A silicone rubber sheet was formed under the same conditions as in Practical Example 3. Characteristics of the silicone rubber sheet were measured, and the results of measurement are shown in Table 1. It can be seen from Table 1 that the obtained silicone rubber has very low tensile strength.

TABLE 1

| | Pr. Ex. 1 | Pr. Ex. 2 | Pr. Ex. 3 | Comp. Ex. 1 | Comp. Ex. 2 |
|---|---|---|---|---|---|
| Liquid silicone rubber base (parts) | 100 | 100 | 100 | 100 | 100 |
| Water with 2.0% of Smecton SA (parts) | 120 | 170 | | | |
| Water with 4.0% of Kunipia G4 (parts) | | | 60 | | |
| Water with 2.0% of water-absorbing polymer (parts) | | | | 120 | |
| Water (parts) | | | | | 60 |
| Sorbitane monooleate (parts) | 1.5 | 6.0 | | 1.5 | |
| SANNONIC SS-50 (parts) | | | 0.5 | | 5 |
| SANNONIC SS-70 (parts) | | | 0.5 | | 5 |

TABLE 1-continued

| | Pr. Ex. 1 | Pr. Ex. 2 | Pr. Ex. 3 | Comp. Ex. 1 | Comp. Ex. 2 |
|---|---|---|---|---|---|
| Emulsification conditions | Emulsified | Emulsified | Emulsified | Emulsified | Emulsified |
| Density | 0.61 | 0.59 | 0.71 | 0.59 | 0.79 |
| Tensile strength (MPa) | 1.6 | 0.7 | 2.9 | 0.4 | 0.1 |

Practical Example 4

The T.K. homomixer used in Practical Example 1 was loaded with the following components: 100 parts of a liquid silicone rubber composition DY35-700A/B (a trade name of Dow Corning Toray Co., Ltd.) composed of a liquid diorganopolysiloxane having at least two vinyl groups in one molecule, a precipitated silica, an organopolysiloxane having at least three silicon-bonded hydrogen atoms in one molecule, and a platinum-type catalyst); 100 parts of water that contains Smecton SA (the content of Smecton SA: 3.0%); and 10 parts of sorbitane monooleate. A silicone rubber emulsion composition was then prepared by mixing the loaded components for 5 min. at 5,000 rpm. Emulsification conditions were good. The emulsion composition was formed into a light-color silicone rubber sheet. The silicone rubber sheet had a density of 0.60 and a tensile strength of 0.50 MPa.

Practical Example 5

100 parts of a dimethylsiloxane-methylvinylsiloxane copolymer having both molecular terminals capped with dimethylvinylsiloxy groups and having a viscosity of 40,000 mPa·s (vinyl group content: 0.14%) and 12 parts of AEROSIL R-972 (a trade name of Nippon Aerosil Co., Ltd., a fumed silica surface treated with dimethyldichlorosilane, BET specific surface of 110 m$^2$/g) were uniformly mixed in a stirrer-equipped mixer and then further mixed for 2 hours at 180° C., whereby a flowable liquid silicone rubber base was prepared. 100 parts of the obtained liquid silicone rubber base, 50 parts of water that contains Smecton SA (a content of Smecton SA: 3.0%), and 1.0 part of sorbitane monooleate were loaded into a T.K. homomixer of the type used in Practical Example 1, and mixed in this homomixer under the same conditions as in Practical Example 4 to produce an emulsion composition. For each 100 parts of the aforementioned dimethylsiloxane-methylvinylsiloxane copolymer contained in the emulsion composition, the latter was mixed with 1 part of a methylhydrogensiloxane-dimethylsiloxane copolymer capped at both molecular terminals with trimethylsiloxy groups (content of silicon-bonded hydrogen atoms: 0.8%), 0.1 part of a complex of chloroplatinic acid and divinyltetramethyldisiloxane (concentration of platinum: 0.4%), and 0.1 part of an addition-reaction inhibitor in the form of 3,5-dimethyl-1-hexyn-3-ol, whereby a silicone rubber emulsion composition was prepared. The obtained silicone rubber emulsion composition was formed into a light-color silicone rubber sheet under the same conditions as in Practical Example 1. The silicone rubber sheet had a density of 0.76 and a tensile strength of 0.85 MPa.

INDUSTRIAL APPLICABILITY

The silicone rubber emulsion composition is suitable for manufacturing a silicone rubber, especially a mechanically strong silicone rubber having a low-density or a mechanically strong silicone rubber sponge. The method for preparation of the silicone rubber emulsion composition is suitable for the production of a silicone rubber emulsion composition, especially for manufacturing a mechanically strong silicone rubber having a low-density or a mechanically strong silicone rubber sponge.

The method for manufacturing a silicone rubber is suitable for manufacturing a mechanically strong silicone rubber having a low-density or a mechanically strong silicone rubber sponge. The obtained silicone rubber is useful as fabricated products, coating layers, printing materials, etc.

The invention claimed is:

1. A method for preparation of an emulsion composition for manufacturing a silicone rubber, the emulsion composition comprising:
    (A) 100 parts by weight of a diorganopolysiloxane having at least two silicon-bonded alkenyl groups in a molecule;
    (B) 10 to 250 parts by weight of water that contains a smectite clay;
    (C) 0.1 to 15 parts by weight of an emulsifier;
    (D) (d1) a cross-linking agent in an amount sufficient for cross-linking component (A), and
        (d2) a catalyst; and
    (E) 0 to 60 parts by weight of a reinforcing silica filler, said method comprising the steps of loading a mixture of an appropriate amount of component (A) and an appropriate amount of component (E) together with an appropriate amounts of components (B) and (C) into a high-speed stiffer-equipped mixer, mixing the components till a uniform emulsion is formed, loading into the mixer an appropriate amount of components (d1) and (d2), and stirring and mixing the components.

2. The method according to claim 1, wherein the smectite clay is a synthetic saponite.

3. The method according to claim 1, wherein the component (B) contains the smectite clay in the amount of 1 to 10 parts by weight per 100 parts by weight of the water.

4. The method according to claim 1, wherein the emulsifier of component (C) comprises a non-ionic surface-active agent.

5. The method according to claim 1, wherein component (d1) is an organohydrogenpolysiloxane having at least two silicon-bonded hydrogen atoms in a molecule, and wherein component (d2) is a platinum-type catalyst.

6. The method according to claim 1, wherein component (E) is a hydrophobically surface-treated reinforcing silica filler.

7. A method for preparation of an emulsion composition for manufacturing a silicone rubber, the emulsion composition comprising:
    (A) 100 parts by weight of a diorganopolysiloxane having at least two silicon-bonded alkenyl groups in a molecule;
    (B) 10 to 250 parts by weight of water that contains a smectite clay;
    (C) 0.1 to 15 parts by weight of an emulsifier;
    (D) (d1) a cross-linking agent in an amount sufficient for cross-linking component (A), and
        (d2) a catalyst; and
    (E) 0 to 60 parts by weight of a reinforcing silica filler, said method comprising the steps of mixing a mixture of an appropriate amount of component (A) and an appropriate amount of component (E) with an appropriate amount of components (d1) and (d2), loading the obtained mixture together with an appropriate amount of component (B) and an appropriate amount of component (C) into a high-speed stiffer-equipped mixer, and then stirring and mixing the components till a uniform emulsion is formed.

8. A method of manufacturing a silicone rubber comprising the steps of:
heating an emulsion composition comprising;
(A) 100 parts by weight of a diorganopolysiloxane having at least two silicon-bonded alkenyl groups in a molecule;
(B) 10 to 250 parts by weight of water that contains a smectite clay;
(C) 0.1 to 15 parts by weight of an emulsifier;
(D) (d1) a cross-linking agent in an amount sufficient for cross-linking component (A), and
(d2) a catalyst; and
(E) 0 to 60 parts by weight of a reinforcing silica filler, thus forming a wet silicone rubber-like substance, and then
dehydrating the obtained wet silicone rubber-like substance.

9. The method according to claim 8, wherein the smectite clay is a synthetic saponite.

10. The method according to claim 8, wherein the component (B) contains the smectite clay in the amount of 1 to 10 parts by weight per 100 parts by weight of the water.

11. The method according to claim 8, wherein the component (C) comprises a non-ionic surface-active agent.

12. The method according to claim 8, wherein component (d1) is an organohydrogenpolysiloxane having at least two silicon-bonded hydrogen atoms in a molecule, and wherein component (d2) is a platinum-type catalyst.

13. The method according to claim 8, further comprising the step of mixing a mixture of components (A) and (E) with other components.

14. A method of manufacturing a silicone rubber comprising heating and dehydrating an emulsion composition comprising:
(A) 100 parts by weight of a diorganopolysiloxane having at least two silicon-bonded alkenyl groups in a molecule;
(B) 10 to 250 parts by weight of water that contains a smectite clay;
(C) 0.1 to 15 parts by weight of an emulsifier;
(D) (d1) a cross-linking agent in an amount sufficient for cross-linking component (A), and
(d2) a catalyst; and
(E) 0 to 60 parts by weight of a reinforcing silica filler.

15. The method according to claim 14, further comprising the step of mixing a mixture of components (A) and (E) with other components.

16. The method according to claim 14, wherein the smectite clay is a synthetic saponite.

17. The method according to claim 14, wherein the component (B) contains the smectite clay in the amount of 1 to 10 parts by weight per 100 parts by weight of the water.

18. The method according to claim 14, wherein the emulsifyer of component (C) comprises a non-ionic surface-active agent.

19. The method according to claim 14, wherein component (d1) is an organohydrogenpolysiloxane having at least two silicon-bonded hydrogen atoms in a molecule, and wherein component (d2) is a platinum-type catalyst.

20. The method according to claim 14, wherein component (E) is a hydrophobically surface-treated reinforcing silica filler.

* * * * *

UNITED STATES PATENT AND TRADEMARK OFFICE
CERTIFICATE OF CORRECTION

PATENT NO.           : 7,732,519 B2                                      Page 1 of 1
APPLICATION NO.      : 12/536702
DATED                : June 8, 2010
INVENTOR(S)          : Shirasaki et al.

It is certified that error appears in the above-identified patent and that said Letters Patent is hereby corrected as shown below:

IN THE CLAIMS:

Column 12, line 31, please delete "stiffer-equipped" before "mixer" and replace with -- stirrer-equipped --

Column 13, line 1, please delete "stiffer-equipped" before "mixer" and replace with -- stirrer-equipped --

Signed and Sealed this
Twenty-eighth Day of December, 2010

David J. Kappos
*Director of the United States Patent and Trademark Office*